Sept. 15, 1942.  F. W. DUNMORE  2,295,570
HUMIDITY MEASURING
Filed Dec. 22, 1938  3 Sheets—Sheet 1

Francis W. Dunmore,
INVENTOR

BY
ATTORNEY

Sept. 15, 1942.　　　F. W. DUNMORE　　　2,295,570
HUMIDITY MEASURING
Filed Dec. 22, 1938　　　3 Sheets-Sheet 2

Francis W. Dunmore,
INVENTOR

BY
ATTORNEY

Sept. 15, 1942.　　　F. W. DUNMORE　　　2,295,570
HUMIDITY MEASURING
Filed Dec. 22, 1938　　　3 Sheets-Sheet 3

Francis W. Dunmore,
INVENTOR

BY
ATTORNEY

Patented Sept. 15, 1942

2,295,570

UNITED STATES PATENT OFFICE 2,295,570

HUMIDITY MEASURING

Francis W. Dunmore, Washington, D. C., assignor to the Government of the United States, as represented by the Secretary of Commerce Application December 22, 1938, Serial No. 247,243

11 Claims. (Cl. 201—63)

(Granted under the act of March 3, 1883, as amended April 30, 1928; 370 O. G. 757)

The invention described herein may be made and used by and for the Government of the United States without the payment of any royalty thereon.

This invention relates to improved method and means particularly, but not exclusively, adapted for the use of radio for sending signals which are a function of the humidity at a remote point. One application of my invention is in the radio meteorograph whereby the humidity of the upper air may be more quickly and accurately obtained than previously.

Heretofore it has been necessary to use mechanically operated humidity indicating devices such as a hair type hygrometer which through some form of mechanical linkage actuates the radio meteorograph transmitter. Where it is necessary to register the humidity of air at increments of height, in the fraction of a second in which the balloon may be at each height (as it rises rapidly at 500 to 1000 ft. per minute), mechanically operated devices such as mentioned above are too sluggish. Furthermore they require mechanical linkages in order to transform their movement (due to humidity change) into measurable variations of the radio signal. The response of the hairs in the hair-type hygrometer which has been used heretofore has been found much too slow for best radio meteorograph work. Furthermore, low temperatures render such a unit unsatisfactory or inoperative.

The object of my invention is therefore to furnish accurate information at ground points of the humidity of the upper air as a function of height, using any desired rate of ascent, by providing a dual coil type hygrometer which is practically instantaneous in its response to humidity changes.

Briefly, the novel method of giving this information consists of a free balloon carrying a small battery operated ultra high radio frequency transmitter with a special form of audio-frequency modulator, the frequency of which is a function of the resistance in its grid circuit. This resistance may be made up of the glass surface between a dual winding on a glass tube. The resistance of this surface is a function of the moisture content in the air in contact with the surface, so that the modulation frequency impressed on the ultra high radio frequency carrier may be interpreted in terms of humidity. An ultra high radio frequency receiver is used on the ground with a graphical frequency recorder calibrated in terms of humidity. Height is determined from the known rate of ascent of the balloon or by switching in alternately with the dual-coil hygrometer any one of the present type of radio meteorograph altitude indicators, such as the pressure operated commutator, the Olland clock device, etc.

While my invention is particularly adapted to the radio meteorograph it may be used to transmit humidity readings between two mobile units, or between two ground stations either by radio or by wire.

Other and further objects of my invention will be apparent from the following detailed description and accompanying drawings. It is to be expressly understood, however, that these drawings are for the purposes of illustration only and not designed for a definition of the limits of my invention. Referring to the illustrations—

Figure 1:
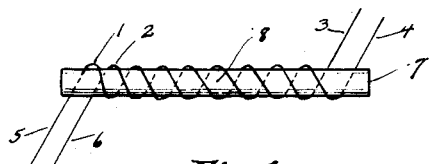
Fig. 1 shows one form of dual-coil hygrometer in which a dual coil of tinned wire is wound upon a thin-walled glass tube which may be coated with a hygroscopic salt.
Figure 2:
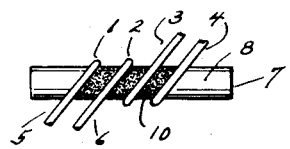
Fig. 2 shows how the surface between the dual coils in Fig. 1 forms a resistor whose value is a function of the moisture content of the air in contact with the surface.

Referring to the drawings more in detail. Fig. 1 shows one form of dual-coil construction which consists of a thin wall flint glass tube 7 about 10 mm. in diameter, 12 cms. long with a wall thickness of about 0.3 mm. The outer surface 8 of the tube is preferably roughened by sand blasting or etching. The tube is wound with a dual coil of #38 tinned copper wire each coil 1 and 2 having 20 turns per inch. The ends 3 and 4 are left free. Ends 5 and 6 form the terminals to the unit. The surface 8 of the glass may be left uncoated (for use at humidities of 60% and above) or it may be coated with a dilute solution of some hygroscopic salt or acid. I have found that dipping the unit into a bath of 0.25 to 2% of a saturated solution of lithium chloride in water and then drying the adherent film of solution makes a good unit, the percent coating depending upon the temperature range to which the unit is to be subject during humidity measurements. Fig. 2 shows the details of construction of Fig. 1 where the coating on the surface 8 is shown at 10, between the coils 1 and 2. For temperatures between +24° C. to −30° C. a 0.5% coating of lithium chloride has been found satisfactory and a coating of 2% for temperatures from −30 to −70° C. If desired 3 units may be used to cover the range from +25° C. to −70° C. with coatings of 0.25%, 1%, and 2% lithium chloride.

The operation of the dual-coil unit may be modified to fit the circuit in which it is to be used as well as the conditions of use, by proper choice of the number of turns, spacing between turns, type of surface and type of coating on the surface. I have found an aging effect which results in a steady decrease in sensitivity with time so that units should be coated just before using or allowed to age in a fixed humidity chamber for a known length of time.

Units constructed as mentioned above operate on the principle that the surface between the turns forms a resistor the resistance of which is a function of the water vapor in the air in contact with the surface. The hygroscopic coating serves to increase the sensitivity of the unit by allowing the surface to take on more moisture for a given humidity. The roughened surface serves to facilitate wetting of the surface and to hold the coating to the glass. The tinned coating on the wire forms a contact with the glass which is less subject to increase in resistance due to oxidation.

I have found that the resistance of these dual-coil units is a function (to a lesser degree) of the temperature so that it is necessary to first calibrate them and establish this temperature correction factor. Once determined it may be applied to the apparent humidity indications to give the true relative humidity.

Since relative humidity is a function of temperature, it is important that the glass be at the temperature of the air in contact with it, to give a true relative humidity reading. To accomplish this result I have used a glass tube with a very thin wall, 0.3 mm., so that the small volume of glass may change in temperature quickly as the unit passes through air strata of different temperatures.

Figure 3:
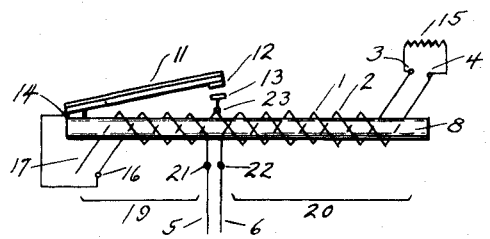
Fig. 3 shows a method of construction to give range expansion whereby two dual-coil units of different sensitivity are used in series, the more insensitive unit being shorted by a bimetallic switch when the unit has reached a certain low temperature.

In Fig. 3 is shown a method of expanding the range of measurement of a unit so that it will function over a wide temperature range. In this unit there are two dual-coil units 19 and 20 in series. 19 has fewer turns than 20 and serves to give humidity readings in the higher temperature range and unit 20 has a larger number of turns and functions at the lower temperatures. Unit 20 has such a low resistance in the high-temperature range as compared to unit 19 that it does not alter the operation of unit 19 even though it is in series with it. Winding 1 is common to both units. Winding 2 with winding 1 form unit 20 and winding 18 with winding 1 form unit 19. These windings in the form shown, are laid on a tube surface 8 of etched glass. One end of winding 1 is connected to terminal 4 connected to resistor 15 and the other end of winding 1 is blank at 17. A contact 13 is connected at point 23 of winding 1. One end of winding 2 is connected to resistor 15 at 3 and the other end 22 forms terminal 6. One end of winding 18 at 21 is connected to terminal 5 and the other end to bi-metal strip 11 at 14. Bi-metal strip 11 carries contact 12 which touches contact 13 when a certain low temperature is reached, thus shorting out unit 19 and allowing unit 20 to function. Resistor 15 serves to indicate when 12 contacts 13 in case unit 20 has reached too high a resistance to operate the transmitter circuits in the absence of resistor 15.

Figure 4:
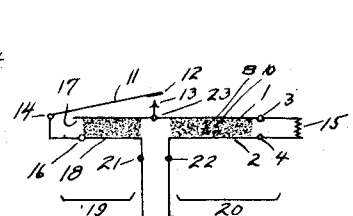
Fig. 4 shows the equivalent circuit arrangement of Fig. 3.

Fig. 4 shows a simplified circuit arrangement of Fig. 2. In this figure the turns 1, 2 and 18 are made straight for simplicity and the humidity-variable resistance surface is shown as surface 8 with coating 10.

Figure 5:
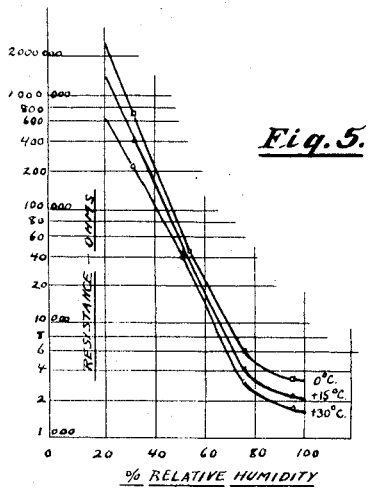
Fig. 5 shows the humidity resistance characteristic for a dual-coil unit at different temperatures.

Fig. 5 shows the humidity-resistance characteristic for a unit at +30° C., the characteristic at +15° C., and the characteristic for 0° C.

Figure 6:
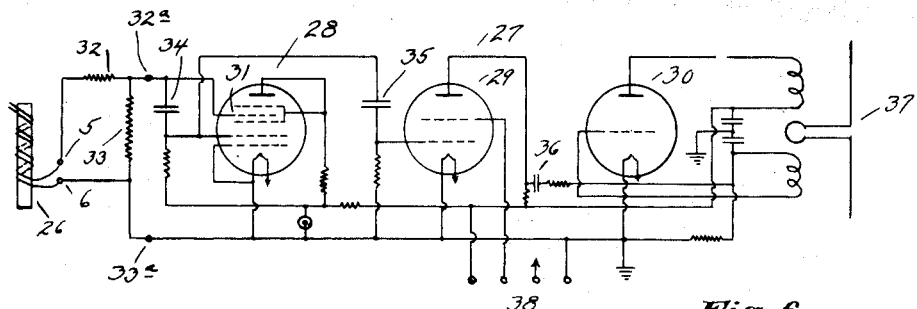
Fig. 6 shows the dual-coil hygrometer associated with a radio meteorograph transmitter circuit.

In order to translate this resistance variation into radio signals which will be a function of humidity, the dual-coil hygrometer is connected to control a characteristic of a transmitter circuit, so that the characteristic will be a function of the resistance of the dual-coil unit. One form of circuit arrangement is shown in Fig. 6. In this circuit the humidity unit is shown at 26 with terminals 5 and 6 connected in the control grid 31 of a generally conventional form of relaxation type of oscillator 28. With this type of oscillator the audio frequency generated is a function of the resistance (among other things) in the control grid circuit. Therefore the humidity (resistance) registered by unit 26 may be calibrated in terms of the audio-frequency output of oscillator 28.

The output of oscillator 28 passes through condenser 35 to audio amplifier 29, thence through condenser 36 where it modulates ultra high radio frequency oscillator 30 with radiating antenna 37. The A and B batteries are connected to terminals 38. For recording humidities in radio meteorography the apparatus in Fig. 6 is carried aloft by a free balloon. Limiting resistor 32 is provided to keep the resistance in the grid circuit 31 from becoming too low and limiting resistor 33 prevents this resistance from becoming too high in cases of extreme variations in resistance of unit 26. By proper choice of 32, 33, feedback condenser 34 and the size, turns and coating on 26 the frequency variation may be limited from 10 to 200 cycles. The audio note received on the ground operates a graphical-frequency recorder with scale limits between 0 and 200 cycles. The scale may be calibrated in terms of apparent relative humidity so the graphical record produced when corrected for temperature reads in terms of relative humidity.

Aside from eliminating mechanical parts this type of humidity device and circuit combination offers several advantages over the hair-type hygrometer which it has been necessary to use heretofore.

One advantage is its property of responding very rapidly to humidity changes. It has a time lag constant of 3 seconds as compared to 40 seconds for the hair-type hygrometer. This high rate of response of the dual-coil electric hygrometer is of particular value when used in a radio meteorograph using pressure switching to give altitude, since readings are obtained corresponding to fixed atmospheric pressure values, the total number of readings obtained during an ascension does not depend upon the rate of balloon ascent. Hence a high rate of ascent is desirable in order to reduce the total time required for securing a complete set of meteorological observations. The response of the dual-coil hygrometer is sufficient for any practical rate of ascent.

A further advantage of the electrical type hygrometer is that since the only connections to it are two small wires it may be located as remotely as desired from the main heat-retaining or absorbing body of the radio meteorograph proper and thus be at the temperature of the air the humidity of which it is measuring.

Another advantage of the electrical hygrometer is that it will function at low temperatures when the hair type unit ceases to operate.

The advantage of humidity scale expansion by the use of several units is also possible with the electrical unit but not with the hair unit.

Figure 7:
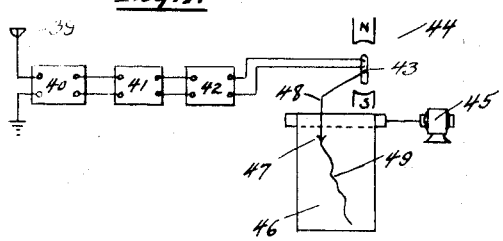
Fig. 7 shows the receiving and graphical recording apparatus which may be used at the ground station.

The ultra high radio-frequency signal carrying the audio modulation produced by the circuit arrangement in Fig. 6 is received on the ground with suitable apparatus such as that shown in Fig. 7, where 39 is the receiving antenna, 40 the ultra-high radio-frequency receiving set, 41 is a filter for passing the modulation frequency range selected for factor indicator, and 42 is a direct-reading frequency meter, which may be of the General Radio Co. electronic type.

The output of this frequency meter in the form shown is connected to moving element 43 of a graphical recorder 44 having motor 45, driving paper 46 moving under pen 47 attached to arm 48, which moves with element 43. The graph 49 is a record of humidity.

Figure 8:
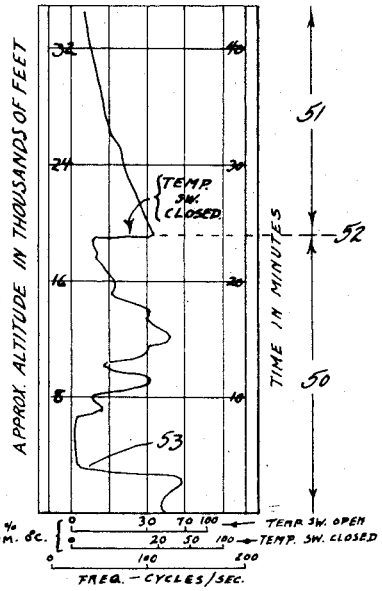
Fig. 8 shows a flight graph produced by the dual-coil hygrometer and circuit arrangement of Figs. 3, 6 and 7.

In Fig. 8 at 50 and 51 is shown a humidity record obtained using the apparatus shown in Figs. 3, 6 and 7. The part 50 shows the humidity variations produced by part 19 (Fig. 3) of the unit and the part 51 of the graph shows the humidity variations produced by part 20 (Fig. 3) of the unit after the temperature switch had closed. The jump at 52 is due to the closing of the temperature switch. The approximate altitude was obtained from the known rate of ascent of the balloon. The sudden drop in the humidity record at 53 indicates the rapidity of response of the unit.

Figure 9:
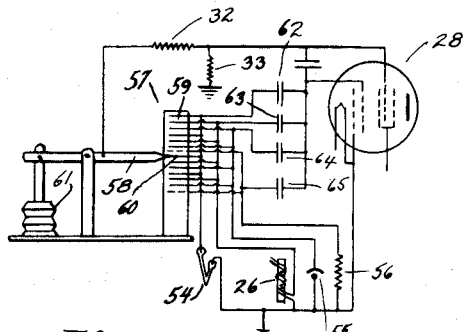
Fig. 9 shows an arrangement for using the dual-coil hygrometer in conjunction with a capillary electrolytic thermometer, light cell, and reference resistor, in combination with a pressure switch for giving altitude.

In Fig. 9 is shown a combination in which the dual coil hygrometer 26 is used in conjunction with an electrolytic capillary temperature tube 54, photo cell 55, calibrating resistor 56, and pressure-switching commutator 57. Contact arm 58 moving over the segments 59 throws into the relaxation oscillator 28 the different measuring units. Contact 60 is moved by arm 58 which is operated by atmospheric pressure element 61. Condensers 62, 63, 64 and 65 are associated with elements 54, 26, 55, and 56, respectively, and are of proper value to give an audio frequency variation of the same order for all units.

Resistors 32 and 33 serve the same function as mentioned in discussing Fig. 6. Temperature indicating device 54 may be of the electrolytic capillary tube type as described in my co-pending application Serial Number 247,242, filed on even date herewith and which has become Patent Number 2,210,903, granted August 13, 1940, with an electrolyte in the capillary which has a high temperature coefficient of resistance such as 1.3 specific gravity sulphuric acid. The resistance of such a device is a function of the temperature of the air adjacent to it.

Figure 10:
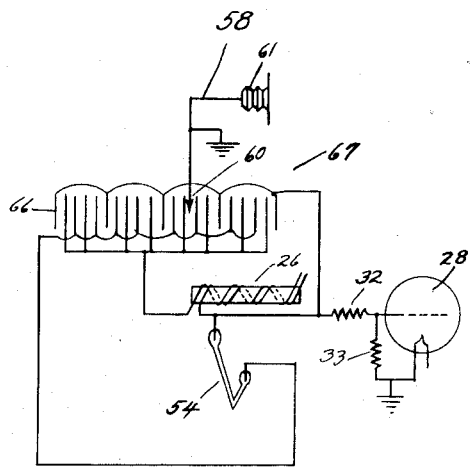
Fig. 10 shows a combination in which the dual-coil hygrometer is used with an electrolytic thermometer in conjunction with a pressure switch.

In Fig. 10 is shown a method of using the dual coil hygrometer with the electrolytic temperature tube and pressure switch for giving altitude. In this arrangement pressure unit 61 operates arm 58 carrying contact 60 as in Fig. 9. The segments 66 of commutator 67 are connected so that, counting from the left the 1st, 6th, 11th, 16th and 21st are connected to resistor 32 so that when contact 60 touches these segments a high reference frequency determined by resistor 32 is transmitted. These references also establish definite altitudes. When 60 contacts the 2nd, 4th, 8th, 10th, 13th, 15th, 18th, and 20th the dual coil electric hygrometer 26 is connected in relaxation oscillator circuit 28 and the note transmitted is a function of humidity. When contact 60 touches segments 3, 5, 7, 9, 12, 14, 17 and 19 the temperature tube 54 is connected to 28 and the note transmitted is a function of temperature. Each contact of 60 with a segment indicates a definite altitude.

Figure 11:
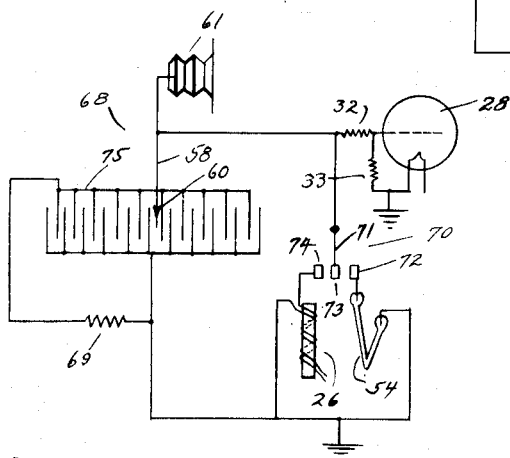
Fig. 11 shows another dual-coil hygrometer, electrolytic thermometer, pressure switch arrangement with auxiliary switching means.

In Fig. 11 is shown another combination in which the dual coil hygrometer 26 and temperature tube 54 are used in conjunction with an auxiliary switch 70 in addition to the pressure switch 68. In this circuit combination pressure element 61 operates arm 58 moving contact 60 across commutator 75. Alternate segments of 75 are connected through reference resistor 69 to ground and intermediate segments directly to ground so that a reference frequency results lower than that produced when resistor 59 is in circuit—that is for the purpose of identification of commutator contacts. When contact 60 is on an insulating segment switch 75—places either the temperature tube 54 or humidity unit 26 in the circuit of the relaxation oscillator 28. When contact 73 of auxiliary switch 70 operated by arm 71 touches contact 74 the humidity element 26 is in circuit and when contact 73 touches contact 72 the temperature tube 54 is in circuit. When contact 73 is between 72 and 74 resistor 33 functions to send a low reference frequency. Any suitable means may be employed for operating the switch 70. For example, a small spring, electric or windmotor, may drive arm 71 by means of cams or gearing, or a suitable resistance capacity time delay circuit may operate arm 71 as a time lag relay.

Figure 12:
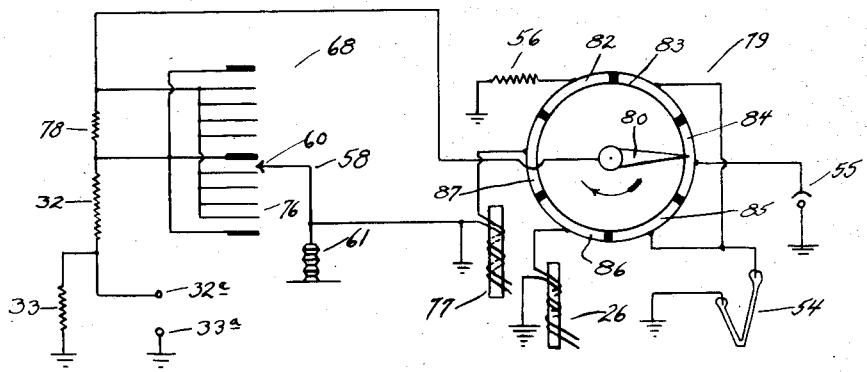
Fig. 12 shows the use of two or more dual-coil hygrometers associated with a six segment commutator, pressure switch and radio meteorograph transmitter for recording temperature, humidity and light intensity.

In Fig. 12 is shown a combination of dual coil hygrometers with a multi-segment commutator for switching into circuit a multiplicity of measuring devices in conjunction with the hygrometers.

In this circuit the same relaxation oscillator 28 and transmitter 27 shown in Fig. 6 may be employed, the factor responsive circuit of Fig. 12 being connected at the points 32a, 33a, in lieu of the simple factor responsive circuit 32—26—33 of Fig. 6. The auxiliary commutator 79 has a shaft 89 driven by some spring or electric motor or air-operated device. Shaft 81 carries contact arm 80 moving over segments 82, 83, 84, 85, 86 and 87. Arm 80 is connected through the resistor 78 to resistor 32 and also to the 2nd, 3rd, 4th, 5th, 7th, 8th, 9th and 10th segment of commutator 76. The 1st, 6th and 11th segment of 76 are connected to the common connection between resistors 78 and 32. Low reference resistor 56 is connected to commutator 82, temperature tube 54 is connected to segments 83 and 86. Segment 84 is connected to photo cell 55, segment 85 is connected to humidity device 26, and segment 87 to humidity device 77, which may cover a different part of the humidity scale than 26 or it may function at lower temperatures than 26.

When contact 60 is on an insulating segment of commutator 76, the revolution of arm 80 of commutator 79 connects the various measuring devices 56, 55, 54, 26, and 77 into the relaxation oscillator 27 through resistors 78 and 32. When contact 60 touches the 2nd, 3rd, 4th, 5th, 7th, 8th, 9th and 10th segments of commutator 76, the commutator 79 is shorted out of circuit and resistors 78 and 32 give a reference frequency. When contact 60 touches the 1st, 6th, and 11th segment resistor 32 only is in circuit and a reference frequency higher than that produced by contact on the other segments is transmitted.

Figure 13:
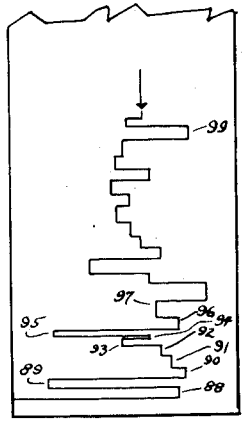
Fig. 13 shows a type of graphical record produced at the receiving station by an arrangement shown in Fig. 12.

In Fig. 13 is shown a type of record as produced by the arrangement shown in Figs. 12 and 7. Here 88 represents the frequency produced by temperature tube 54 (Fig. 12) when arm 80 touches contact 83 (temperature) 89 the frequency produced when 80 touches segment 84 (light brightness), 90 the frequency produced when arm 80 touches segment 85 (humidity for high temperatures), 91 the frequency produced when 80 touches 86 (second temperature reading), 92 the frequency produced when 80 touches 87 (second high-temperature himidity), 93 the frequency produced when 80 touches 82 (reference frequency reading), 94 the frequency produced when 80 touches segment 83 (3rd temperature reading), 95 the frequency produced when 80 touches segment 84 (second light intensity reading), 96 the frequency produced when 80 touches 85 (second humidity reading for low temperatures), 97 the frequency produced when 80 touches 86 (4th temperature reading), 98 the frequency produced when contact 60 of pressure commutator 68 shorts the commutator 79 and touches the top segment of commutator 76. 99 the frequency produced when 60 touches the second segment of 76 from top, etc.

Figure 14:
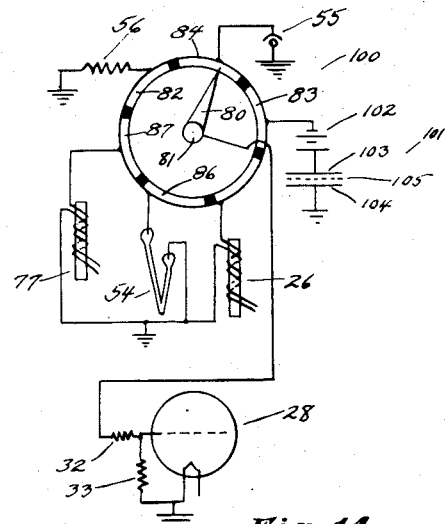
Fig. 14 shows the dual-coil hygrometer associated with the electrolytic thermometer without pressure switch, but with ionic altimeter.

In Fig. 14 is shown a commutator 100 similar to 79 in Fig. 12 except that the extra temperature tube segment 83 is used for ionic altimeter 101 in series with battery 102. Ionic altimeter 101 may be of the type disclosed in the copending Dunmore and Lapham application, Serial No. 317,320, filed February 5, 1940, and may be calibrated in terms of atmospheric pressure and produce a frequency proportional to the density of the air between its plates 103 and 104. 105 is a coating of radio-active material for ionizing the air.

The system of Fig. 14 (as pointed out in Fig. 12) is particularly useful for multiplying the number of indications with reference to the number that may be attained by direct use of the pressure commutator, alone.

In addition, the auxiliary driven switching means of Fig. 14 is particularly useful when it is desired to eliminate the relatively high and variable resistance of the delicate pressure-switch contact 60. In this connection, the pressure indications are provided by one of the elements connected to the switching means 100, such as the ionic altimeter or pressure indicator 103—105 or any similar device, which preferably is inherently pressure-varied in resistance.

There has been described above what is now considered to be the best embodiment of the invention, but it is to be understood that the invention is not limited to the details of the embodiment disclosed, but is defined by the reasonable scope of the appended claims.

I claim:

1. A humidity responsive device comprising an insulating member, at least two bare wire conductors having a multiplicity of turns juxtaposed to the surface of said member in bifilar arrangement, and a thin exposed hygroscopic film carried by the surface of said member and the exposed surface of said conductors and in electrical contact with the said conductors, the resistance of which varies substantially continuously in response to changes of relative humidity of the atmosphere with which it is in contact.

2. A device of the class described comprising a thin-walled flint glass tube exposed to atmospheric moisture, a pair of fine bare tinned copper wires coiled in closely spaced relation on said tube, and means rendering hygroscopic the surface of said tube whereby the surface of said tube between said conductors will pick up and give off moisture in response to changes in atmospheric relative humidity.

3. A device according to claim 2 in which said last-named means consists in a roughened or etched surface provided on said tube.

4. A device according to claim 2 in which said last-named means consists in a thin exposed hygroscopic film provided on said tube.

5. A dual coil hygrometer comprising a thin-walled insulating member of low thermal capacity, at least two bare electrical conductors carried by said member, and a thin exposed film of hygroscopic salt having a resistivity varying substantially continuously with changes in humidity carried by said member in electrical contact with said conductors.

6. The method of forming a dual coil hygrometer which consists in winding on a thin-walled tube of insulating material a pair of mutually spaced bare electrical conductors in multi-turn bifilar arrangement, then dipping the unit thus formed in a dilute solution of a hygroscopic material to form thereon a thin film of such material overlying said conductors and tube and thus having a large area of electrical contact with the conductors and exposed to the atmosphere throughout said area of contact, and drying the thin hygroscopic film thus formed, whereby there is produced a hygrometer having an electrical resistivity varying substantially continuously with relative humidity.

7. The method of forming a hygrometric unit which consists in applying to an insulating member at least two closely spaced conductors, dipping the unit thus formed into a bath of 0.25 to 2 per cent saturated solution of lithium chloride and drying the unit.

8. In a hygrometer, means providing a surface the resistance of which is a function of the water vapor in contact with the surface, a first pair of conductors carried by said surface in mutually spaced relation, a second pair of conductors similarly carried by said surface, said pairs of conductors being serially connected by the connection of one conductor of the first pair to one conductor of the second pair, and means responsive to temperature change for short-circuiting one of said pairs of conductors at a predetermined low temperature whereby the range of humidity response is increased at low temperatures.

9. In a hygrometer, means providing a surface the resistance of which is a function of the water vapor in contact with the surface, a first pair of conductors carried by said surface in mutually spaced relation, a second pair of conductors similarly carried by said surface, said pairs of conductors being serially connected by the connection of one conductor of the first pair to one conductor of the second pair, means responsive to temperature change for short-circuiting one of said pair of conductors, and a resistance connected across the other pairs of conductors at a predetermined low temperature whereby the range of humidity response is increased at low temperatures.

10. In a radiometeorograph or the like, an electrical circuit, and a dual coil hygrometer connected in said electrical circuit comprising a thin walled insulating member having a pair of mutually spaced bare electrical conductors wound thereon in bifilar arrangement and presenting a surface in electrical contact with said conductors the unit resistivity of which changes inherently and in a continuous manner in response to the relative humidity of the atmosphere to which it is exposed, whereby the resistance imparted to the electrical circuit is a continuous function of relative humidity.

11. A dual coil hygrometer according to claim 5, said thin exposed film of hygroscopic salt having the characteristics of a film deposited from a one-tenth or less saturated aqueous solution of the salt.

FRANCIS W. DUNMORE.